Nov. 12, 1929.                    C. L. SNYDER                    1,735,800
                    DECKING APPARATUS FOR AUTOMOBILE BODIES
                         Filed Aug. 21, 1928        2 Sheets-Sheet 1
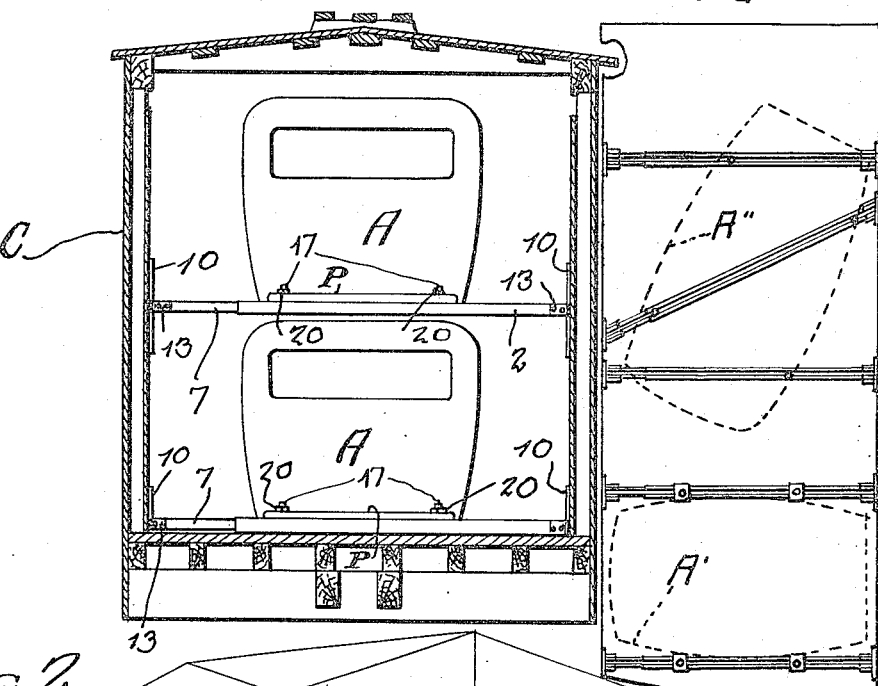
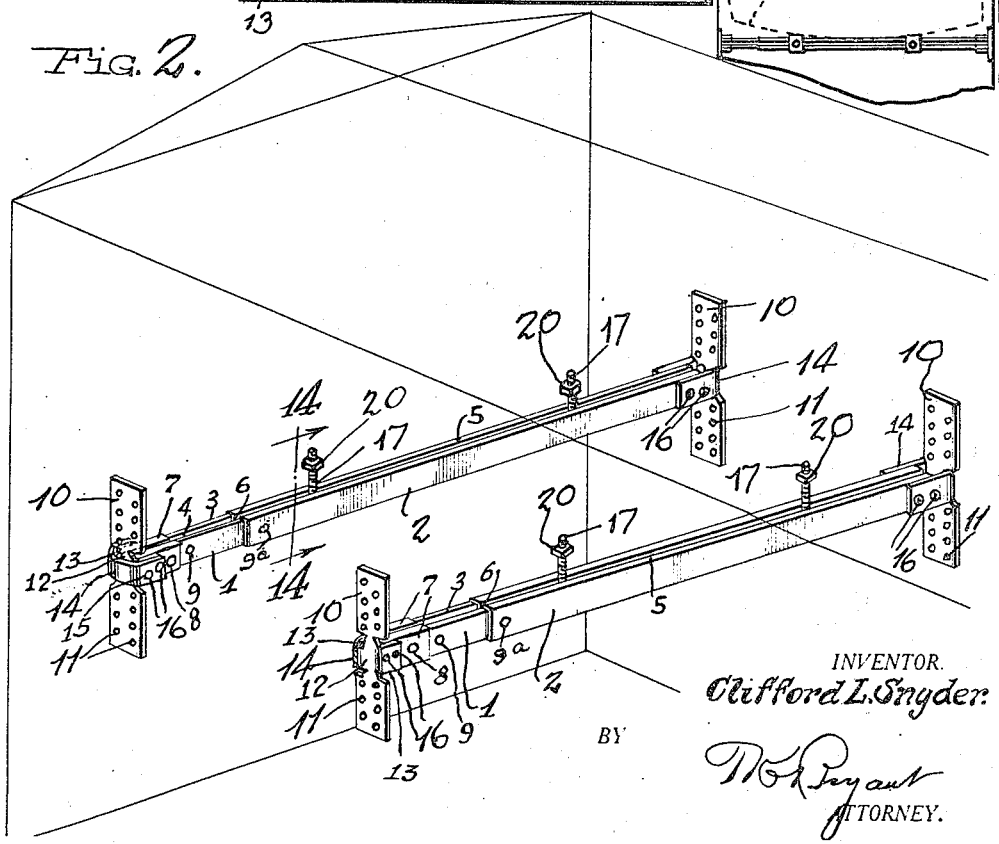
INVENTOR.
Clifford L. Snyder.
BY
ATTORNEY.

Nov. 12, 1929.  C. L. SNYDER  1,735,800
DECKING APPARATUS FOR AUTOMOBILE BODIES
Filed Aug. 21, 1928   2 Sheets-Sheet 2
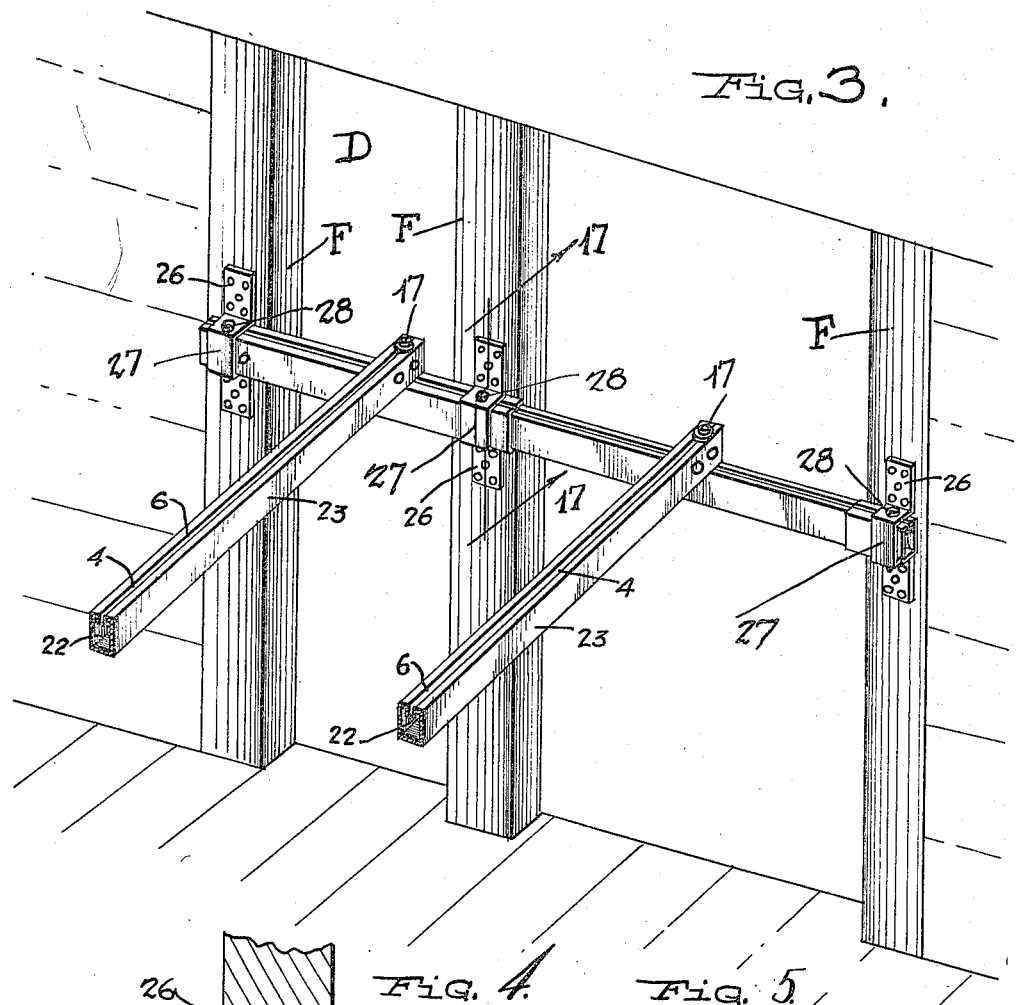
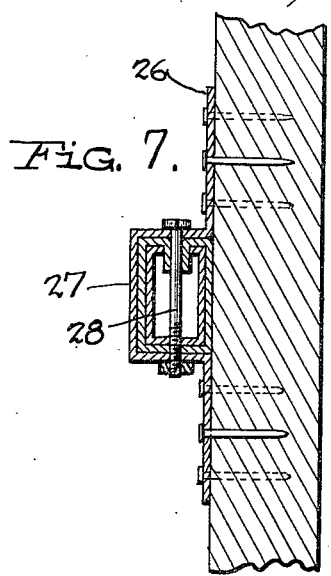
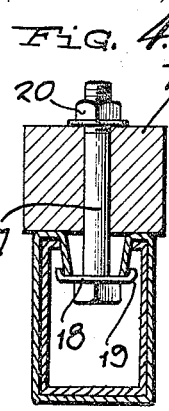
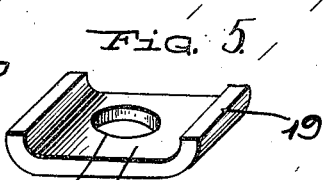
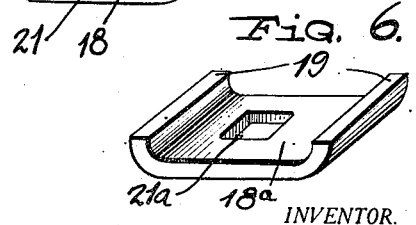
INVENTOR.
Clifford L. Snyder.
BY
ATTORNEY.

Patented Nov. 12, 1929

1,735,800

UNITED STATES PATENT OFFICE

CLIFFORD L. SNYDER, OF DETROIT, MICHIGAN, ASSIGNOR TO THE EVANS AUTO LOADING CO., INC., OF DETROIT, MICHIGAN, A CORPORATION OF DELAWARE

DECKING APPARATUS FOR AUTOMOBILE BODIES

Application filed August 21, 1928. Serial No. 300,993.

This invention relates to certain new and useful improvements in method and apparatus for loading automobile bodies in freight cars and other transportation facilities in which the apparatus comprises knock-down returnable steel decking permitting superimposition of automobile bodies or other objects above a lower load on the floor.

Another object of the invention is to provide a steel deck structure readily detachable from the transportation means, such as a railroad car and being designed to permit mounting thereof in the end portions of the car and also adaptable for mounting in spanning relation to the side door opening of the car.

Another object of the invention is to provide a steel deck for the above purposes in which the deck is comprised of supporting bars of iron channel formation formed of telescopic sections permitting relative movement between the sections to compensate for body vibrations of the railroad car and weaving of the car during transit.

A still further object of the invention is to provide a steel decking of the above type designed to permit anchoring bolts for the automobile being positioned at desired points over the length of the decking, the free movement between the sections afforded by the telescopic association thereof eliminating the possibility of the end supporting brackets for the deck member being pulled from the walls of the car.

Another object of the invention is to provide a steel decking for the shipment of automobiles that may be easily and inexpensively manufactured and which may also be readily detached from a carrying car and returnable for further use.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a vertical cross-sectional view of a freight car equipped with the detachable and returnable steel deck and showing automobile bodies supported in the car in superposed relation; Figure 1A is a diagrammatic view showing bodies extending transversely and at an angle;

Figure 2 is a perspective view of a pair of deck bars or beams supported in one end of a railroad car upon the side walls thereof, the car being diagrammatically illustrated;

Figure 3 is a fragmentary perspective view of a portion of a railroad car showing the side door opening with the steel deck structure supported across the door opening;

Figure 4 is a cross-sectional view taken on line 14—14 of Figure 2 showing an anchoring bolt for the automobile carried by the transverse deck beam;

Figures 5 and 6 show perspective views of anchoring plates for machine and carriage bolts respectively; and Figure 7 is a detail sectional view taken on line 17—17 of Figure 3, showing the locking bolt for retaining the extensible sections of the door beam against sliding movement.

As illustrated in Figure 1, the automobile bodies A are mounted in the freight car C in superposed relation, the supporting beams of the steel decking extending transversely of the car and being attached at their ends to the side walls thereof, while in Figure 3, the steel decking arrangement is illustrated as mounted upon a support in line with the side door opening D of the car C.

The transverse beams of the steel decking for supporting the automobiles A, each comprises a pair of telescopically connected channel irons 1 and 2, the channel irons being U-shaped in cross-section with the iron 1 smaller than the iron 2 for the telescopic reception thereof. The upper edges of the side walls of the channel iron 1 carry horizontal inwardly directed flanges 3 terminating at points spaced from each other to provide an intervening slot 4, while the channel iron 2 has inwardly directed flanges 5 at the upper edges of the sides thereof that carry depending ribs 6 spaced from each other for depending reception in the slot 4 formed by the spaced flanges 3 on the channel iron 1. A rectangular collar 7 of dimensions and of a configuration corresponding to the channel iron 2 is mounted upon the outer end of the channel iron 1 to limit closing telescopic movement of the assembled channel iron sections 1 and 2. Transverse openings 8 are formed in the collar 7 and channel iron 1 and also in the outer end of the channel iron 2 to accommodate the passage of bolts for attaching the outer ends of the telescopic sections to supporting brackets. Similar openings 9 and 9ª are formed in the channel irons 1 and 2 and are adapted to register when the sections are fully closed upon each other to receive a retaining bolt for holding the sections against relative movement during return shipment thereof for another installation.

The brackets for supporting the ends of the transverse beams, each comprises a bracket plate 10 having a plurality of nail receiving openings 11 in opposite ends thereof while the intermediate portion of the bracket plate 10 is offset as at 12 with opposite sides of the offset portion 12 cut away from the bracket plate 10 and curved outwardly to provide an arcuate guide 13. A U-shaped strap 14 incloses the arcuate guide 13 with the looped portion thereof set into the offset portion 12 of the bracket plate shown in Figure 2, while the side legs of the strap 14 are provided with bolt receiving openings 15 to be aligned with the openings 8 in the outer ends of the telescopic channel irons 1 and 2. Bolts 16 are inserted through the aligned openings and the transverse beams are so supported in the mounting brackets.

Before the telescopic channel irons 1 and 2 are assembled, retaining means for an automobile to be supported on the transverse beams are associated with the channel iron and comprise retaining bolts 17 having the apertured plate clips 18 received thereon and disposed within the telescopic channel irons as shown in Figure 4 with the upwardly curved ends 19 of the plate clips 18 engaging the lower edges of the depending ribs 6 upon the channel iron section 2. The plate clip 18 and bolts 17 are freely slidable through the channel irons, the bolts extending thereabove to be engaged with a part P of the automobile A and so retained by the nut 20. The form of plate clip 18 shown in Figure 5 has an opening 21 centrally thereof for the passage of a machine bolt while the opening 21ª as shown in the plate clip 18ª having curved ends 19ª in Figure 6 is of rectangular formation for the passage of a carriage bolt. With the transverse beams so supported at their ends, free telescopic movement of the channel iron sections is permitted as the bolts 17 clampingly connect the part P of the automobile to the depending ribs 6 on the channel iron section 2, the relative movement between the channel iron sections compensating for jars and vibration incident to travel and also lateral weaving of the side walls of the freight car C. A connection of this character which permits free movement between the channel iron sections allows the car A to remain undisturbed in its rigid mounting on one of the channel irons as illustrated in Figure 1. Also, the free mounting of the bolt 17 and plate clip 18 permits desired adjustment thereof for convenient attachment to the part P of the automobile.

This invention further includes the provision of devices rendering it possible to utilize the entire area for the double decking and shipment of automobiles in a freight car, and more particularly with reference to the area between the side door opening and as shown in Figure 3, a longitudinally extending beam is supported by the frame bars F of the door opening D with the transverse beams mounted at their ends thereon, an additional frame bar F being located between the usual side frame bars. The longitudinally extending beam is of a construction similar to the cross-beams, there being provided a channel iron section 22 similar to the channel iron 1 and a channel iron section 23, telescoping thereon that is similar to the channel iron 2. The channel iron 22 is provided with an end collar limiting telescoping movement of the two sections, while openings are formed in the side walls of the channel iron sections 21 and 22 to hold them assembled while being returned from a shipment. The assembled sections 22 and 23 of the longitudinal beam are mounted in brackets secured to the frame bars F of the door opening, the brackets, each comprising an end attaching plate 26 and an intermediate looped portion 27 rectangular in cross-section as shown in Figure 7 to receive the longitudinal beams. The upper and lower sides of the looped portions 27 of the brackets 26 are apertured as illustrated in Figure 7 to register with openings formed in the bottom walls of the telescopic sections 22 and 23 for the passage of retaining bolts 28. The channel irons 22 and 23 are rigidly connected together by the lock bolt associated with the intermediate bracket and provides a rigid and substantial support for the ends of transverse beams that are anchored thereto by bolts 17.

The invention embodies a method of assembly and the mounting of the automobile body, together with the apparatus for carrying the method into operation and while it is believed that the construction and operation of the invention will at once be apparent from the above detailed description, it is to be understood that various changes may be made in the details of construction as well as in the method of assembly without departing from the spirit and scope of the invention as claimed.

As shown in Fig. 1ᴬ the body A′ is of a length to extend transversely of a car and is supported at its sides on transversely extending supports while the body A″ is of a size to necessitate angle mounting thereof, preferably upon two transverse supports and an angularly disposed support. The supports may be mounted in any convenient manner to accommodate various positions of the car bodies for the perfect support thereof. Any type of body can be mounted by merely adjusting the supports.

What I claim as new is:—

1. The method of loading automobile bodies in freight cars consisting of securing a plurality of supporting sectional members of substantially the same length transversely of the freight car in a manner to permit relative longitudinal movement of the sections for substantially their entire lengths and anchoring an automobile to one of the sections above the other section without disturbing the free movement between the sections.

2. The method of loading automobile bodies in freight cars and the like in line with the doors thereof comprising removably securing bars to said car across the door openings, securing a plurality of supporting sectional members of substantially the same length transversely of the car on the bars in a manner to permit relative longitudinal movement of the sections for substantially their entire lengths and anchoring an automobile to one of the sections above the other section without disturbing the free movement between the sections.

3. Decking apparatus for the shipment of automobile bodies comprising extensible transverse beams formed of interfitting members of substantially equal lengths, and removable wall brackets to which the ends of the beams are detachably connected.

4. Decking apparatus for the shipment of automobile bodies comprising extensible transverse telescoping channel iron sections, and removable wall brackets to which the ends of the channel iron sections are detachably connected.

5. Decking apparatus for the shipment of automobile bodies comprising extensible transverse beams, removable wall brackets to which the ends of the beams are detachably connected, and means freely shiftable relative to the transverse beams and rigidly attached to a car body for supporting the latter in clamped engagement with the beam.

6. Decking apparatus for the shipment of automobile bodies comprising extensible transverse telescoping channel iron sections, removable wall brackets to which the ends of the channel iron sections are detachably connected, and means freely shiftable relative to the channed iron sections and rigidly attached to a car body for supporting the latter in clamped engagement with the channel iron sections.

7. Decking apparatus for the shipment of automobile bodies comprising extensible transverse telescoping channel iron sections, removable wall brackets to which the ends of the channel iron sections are detachably connected, and means freely shiftable relative to the channel iron sections and rigidly attached to a car body for supporting the latter in clamped engagement with one of the channel iron sections in a manner to permit relative movement between the channel iron sections.

8. Decking apparatus for the shipment of automobile bodies comprising slidably connected transversely extending telescoping members overlapping for substantially their entire length, and anchoring means for an automobile connected to one of the members without disturbing the slidable movement between the members.

9. Decking apparatus for the shipment of automobile bodies comprising slidably connected transversely extending telescoping members, anchoring means for an automobile connected to one of the members without disturbing the slidable movement between the members, and removably mounted brackets to which the outer ends of the members are detachably connected.

10. Decking apparatus for the shipment of automobile bodies comprising telescoping channel iron sections, means on one section to limit telescoping movement, removable wall brackets to which the outer ends of the channel iron sections are detachably connected, a strap carried by each bracket for attachment to the sections and anchoring means for an automobile clampingly engaged with one of the sections.

11. Decking apparatus for the shipment of automobile bodies comprising telescoping channel iron sections, means on one section to limit telescoping movement, removable wall brackets to which the outer ends of the channel iron sections are detachably connected, a strap carried by each bracket for attachment to the sections, and anchoring means for an automobile clampingly engaged with one of the sections, the outer channel iron section having ribs depending into the inner section and engaged by the anchoring means.

12. Decking apparatus for the shipment of automobile bodies comprising telescoping sections, removable wall brackets to which the outer ends of the sections are detachably connected, each bracket having a mounting plate and an intermediate offset portion, a U-shaped strap inclosing the offset portion with the ends thereof engaged with the telescoping sections and anchoring means for an automobile adjustably associated with the sections.

13. Decking apparatus for the shipment of automobile bodies comprising telescoping channel iron sections, inwardly and downwardly directed flanges on the outer section extending into the inner section, removable wall brackets to which the outer ends of the channel iron sections are detachably connected, and anchoring means for an automobile including a bolt passing through a part of the automobile and carrying a plate clip engaged with the flanges on the outer channel iron section.

14. Decking apparatus for the shipment of automobile bodies comprising telescoping channel iron sections, inwardly and downwardly directed flanges on the outer section extending into the inner section, removable wall brackets to which the outer ends of the channel iron sections are detachably connected, and anchoring means for an automobile including a bolt passing through a part of the automobile and carrying a plate clip engaged with the flanges on the outer channel iron section, spaced from the inner channel iron section permitting free relative movement between the two sections.

15. Decking apparatus for the shipment of automobile bodies comprising slidably connected transversely extending members, anchoring means for an automobile connected to one of the members without disturbing the slidable movement between the members, and extensible rigidly mounted longitudinal supporting beams for the transversely extending members spanning the side door opening of a freight car above the floor line.

16. Decking apparatus for the shipment of automobile bodies comprising supporting members longitudinally adjustable and detachably mounted supporting brackets for the supporting members having reduced portions to which the supporting members are pivotally connected for permitting pivotal movement of the members for transverse and angular dispositions of the supporting members.

17. Decking apparatus for the shipment of automobile bodies comprising extensible telescoping members and brackets to which the outer ends of the members are attached.

In testimony whereof I affix my signature.

CLIFFORD L. SNYDER.